July 12, 1949.                    H. G. WESLEY                    2,475,930
              KALEIDOSCOPIC APPARATUS FOR PROJECTING
                         SYMMETRICAL DESIGNS
Filed June 4, 1948                                          3 Sheets-Sheet 1

Inventor
Huey G. Wesley
By
Attorneys

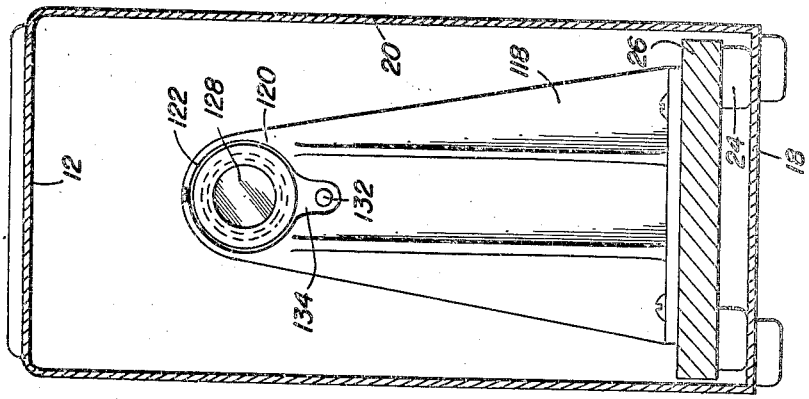
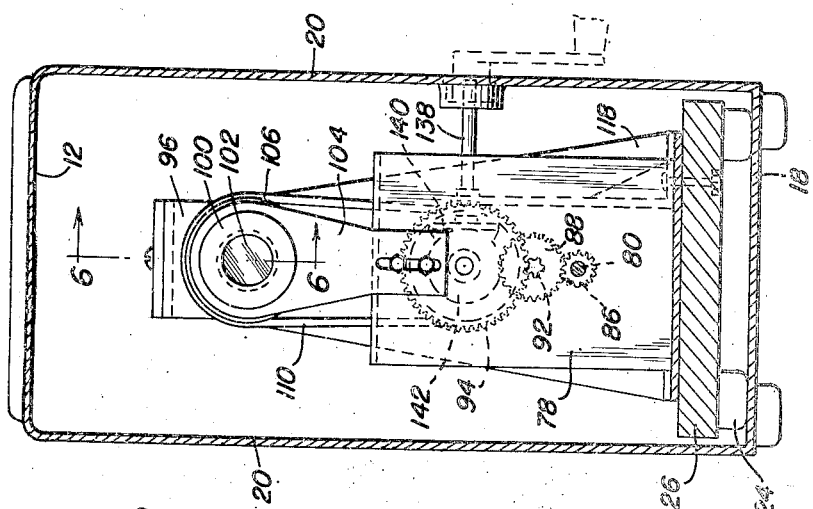
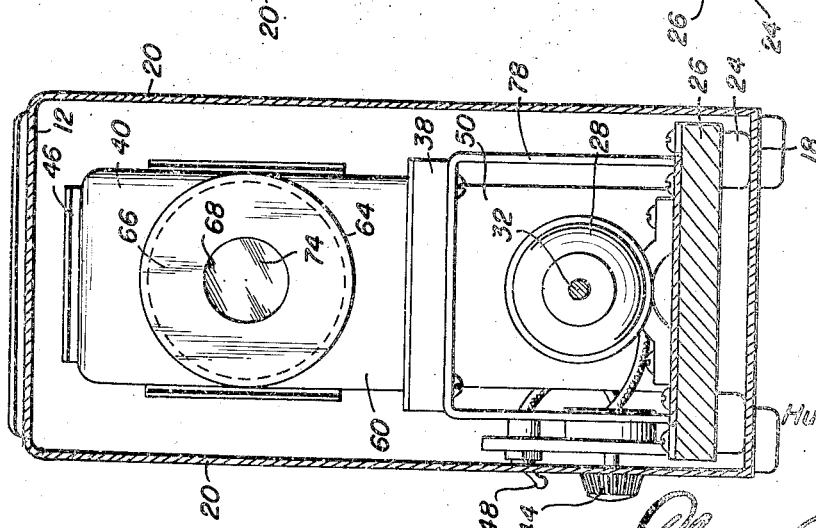

July 12, 1949.
H. G. WESLEY
2,475,930
KALEIDOSCOPIC APPARATUS FOR PROJECTING
SYMMETRICAL DESIGNS
Filed June 4, 1948
3 Sheets-Sheet 3
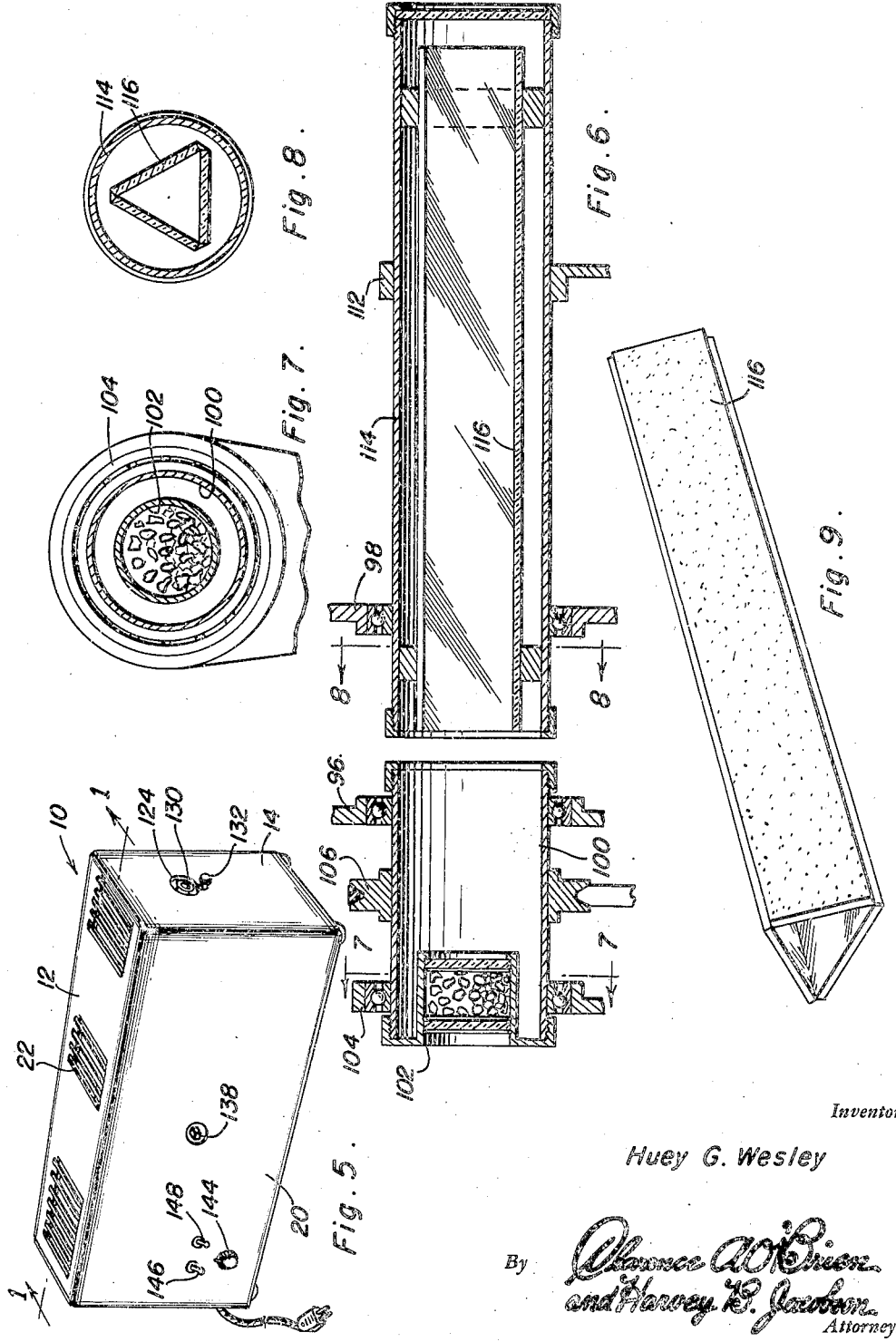
Inventor
Huey G. Wesley Patented July 12, 1949

2,475,930

UNITED STATES PATENT OFFICE 2,475,930

KALEIDOSCOPIC APPARATUS FOR PROJECTING SYMMETRICAL DESIGNS

Huey G. Wesley, Chillicothe, Ohio, assignor of one-third to James O. Wesley, Chillicothe, Ohio Application June 4, 1948, Serial No. 31,101

8 Claims. (Cl. 88—24)

This invention relates to new and useful improvements in kaleidoscopes and the primary object of the present invention is to provide a novel and improved apparatus for projecting symmetrical designs upon a screen or the like which are entertaining in appearance.

Another important object of the present invention is to provide a designoscope including a motor driven kaleidoscope for projecting colorful designs upon a screen and embodying novel and improved means for stopping the kaleidoscope at a desired point for retaining a selected design projected upon the receiving screen.

A further object of the present invention is to provide an apparatus for projecting designs including a light reflector for directing light rays through a rotary kaleidoscope and means for cooling the source of light so that the said kaleidoscope may be stopped in a selected rotated position without effecting the efficient operation of the same.

A still further aim of the present invention is to provide an apparatus for projecting symmetric and colored designs that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a transverse vertical sectional view taken substantially on the plane of section line 2—2 of Figure 1;

Figure 3 is a transverse vertical sectional view taken substantially on the plane of section line 3—3 of Figure 1;

Figure 4 is a transverse vertical sectional view taken substantially on the plane of section line 4—4 of Figure 1;

Figure 5 is a perspective view of the design projector constructed in accordance with the present invention;

Figure 6 is an enlarged fragmentary longitudinal vertical sectional view taken substantially on the plane of section line 6—6 of Figure 3;

Figure 7 is a transverse vertical sectional view taken substantially on the plane of section line 7—7 of Figure 6;

Figure 8 is a transverse vertical sectional view taken substantially on the plane of section line 8—8 of Figure 6; and, Figure 9 is a perspective view of the light directing means used in conjunction with the present invention.

Figure 1:
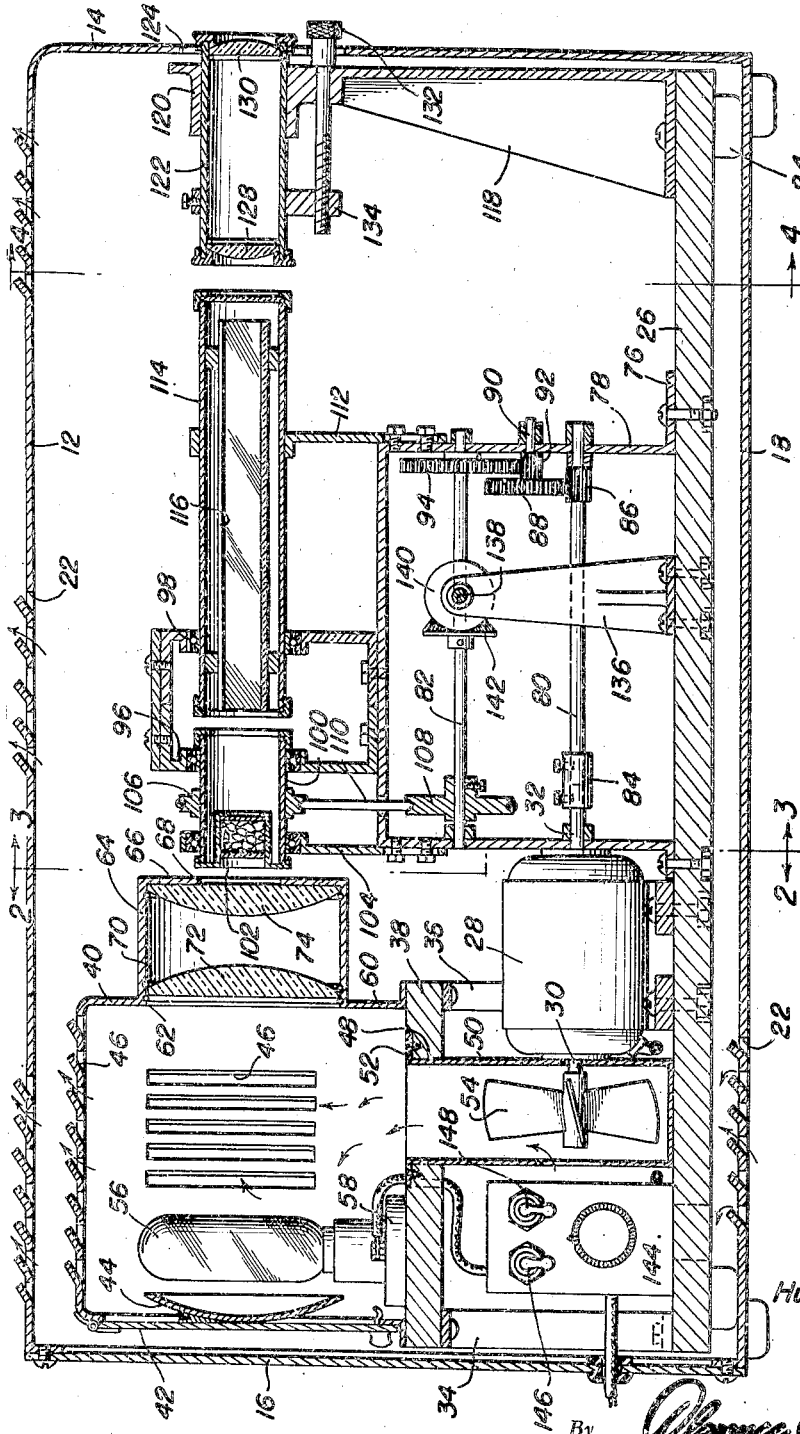
Figure 1 is a longitudinal vertical sectional view of the present invention taken substantially on the plane of section line 1—1 of Figure 5.

Referring now to the drawings in detail, wherein for the purpose of illustration, there is disclosed a preferred embodiment of the present invention, the numeral 10 represents a substantially rectangular casing or housing of any substantial material having an upper wall 12, a forward wall 14, a removable rear wall 16, a bottom wall 18, and side walls 20. The upper wall 12 and bottom wall 18 are formed with a plurality of longitudinally spaced transverse louvers or openings 22 that will afford a means for permitting air to enter the housing 10.

Supported within the housing 10 and upon the bottom wall 18 by feet 24, is a substantially rectangular base or support plate 26 on which there is removably secured an electric motor 28 having a drive shaft the ends 30 and 32 of which project outwardly from the motor for a purpose that will later be more fully apparent.

Removably secured to the base 26, adjacent the rear wall 16 of the housing 10, is a pair of spaced parallel substantially U-shaped supports 34 and 36 the web portions of which removably support a platform or the bottom wall 38 of a light bulb housing 40. This latest housing 40 includes a hinged rear wall 42 that supports a substantially concavo-convexed reflector 44 and the upper wall and side walls of the housing 40 are provided with louvers 46.

Extending downwardly through an opening 48 provided in the platform 38, is a conduit or passage 50 the upper open end of which is provided with a flanged portion 52 that is removably secured to the upper face of the platform 38.

A fan blade 54 is fixed on the end 30 of the motor drive shaft for directing a supply of air into the housing 40 for cooling a lamp bulb 56 that is retained in a supporting socket 58 carried by the platform 38 and which opposes the reflector 44.

The forward wall 60 of the housing 40 is provided with an opening 62 from which there projects a sleeve 64 that is integrally formed with the forward wall 60. The forward end of the sleeve 64 is provided with a closure plate 66 having a central opening 68.

Retained within the sleeve 64 by split holding rings 70 is a pair of spaced parallel cooperative lenses 72 and 74 having opposed convexed faces. These lenses 72 and 74 oppose the lamp bulb 56 for magnifying light rays emitted from the source of light.

Removably secured to the base 26, are the angulated end portions 76 of a substantially U-shaped support 78 the leg portions of which rotatably support a pair of spaced parallel shafts 80 and 82, one of which for example shaft 80 is coupled by a sleeve 84 to the end 32 of the motor drive shaft.

The shaft 80 supports a reduced gear 86 that engages an annular gear 88 carried by an idler shaft 90 rotatably carried by one leg of the support 78, and this shaft 90 also supports a reduced gear 92 that engages a further annular gear 94 carried by the shaft 82 whereby the shaft 82 will be driven at a reduced rate of speed than that at which the shaft 80 is rotating.

A pair of substantially channel shaped bearing members 96 and 98 are removably supported on the web portion of the support 78.

The bearing member 96 rotatably supports a cylinder 100 in which there is mounted a kaleidoscope 102. This cylinder 100 is further supported in a bearing member 104 adjustably supported on the member 78. The cylinder 100 is provided with a pulley 106 that is connected to a pulley 108 fixed on the shaft 82 by an endless pulley belt 110 whereby the cylinder 100 will be driven by the motor 28.

A still further bearing or support member 112 is adjustably carried by the member 78 and cooperates with member 98 to support a further cylinder 114 in which there is mounted a substantially triangular light directing trough 116 one end of which extends into the cylinder 100. This trough 116 includes a group of joined, elongated substantially rectangular plates the inner surfaces of which are mirrored and the outer surfaces of which are coated with a non-reflecting material.

Removably supported on the base 26 is an upright, or support 118 having a guide sleeve 120 fixed to its upper end that slidably receives a sleeve 122 which registers with and extends outwardly from a projecting opening 124 provided in the forward wall 14.

Retained in the sleeve 122 by split rings 126 is a pair of spaced parallel lenses 128 and 130 having oppositely disposed convexed faces.

Rotatably supported by the forward wall 14 and the guide 120, is an adjusting bolt 132 having an externally threaded end that receivably engages an internally threaded opening in a collar 134 that embraces and which is removably secured to the sleeve 122.

In order to rotate the cylinder 100 without use of the motor 28, there is provided a support 136 fixed within the housing 10 that rotatably supports a shaft 138 that carries a beveled gear 140 which engages a further beveled gear 142 carried by the shaft 82. One end of the shaft 138 projects outwardly from one side wall of the housing 10 to receive a suitable crank handle.

A voltage regulator 144 is mounted in the housing 10 and controls the speed rotation of the motor 28 as well as the current to the light bulb 56, and this regulator is provided with a lamp control switch 146 and a motor control switch 148.

In practical use of the present invention, the cylinder 100 will be rotated by the motor 28 and the light rays emitted from the lamp 56 will be directed through the lenses 72 and 74, the kaleidoscope 102, the prismatic trough 116, the lenses 128 and 130 and hence outwardly from the casing.

The jewels within the kaleidoscope will cause light rays to be directed from the casing of various shapes, designs and the like.

When a desired design has been projected on a screen (not shown) that is disposed in front of the casing, the motor may be braked or stopped, thus retaining the desired design.

Obviously, the cylinder 100 may be rotated manually until the desired design has been projected on a screen or the like.

To focus the design, an operator merely adjusts the bolt 132, it being understood that lenses 72 and 74 are fixed apart a predetermined distance and that member 114 may be longitudinally adjusted relative to the cylinder 100.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An apparatus for displaying designs comprising a housing including a forward wall having a projecting opening, an electric motor mounted in said housing having a drive shaft, the ends of said drive shaft projecting outwardly from said motor, a first support mounted in said housing, a bearing carried by said first support, a cylinder rotatably carried by said bearing, means operatively connecting said cylinder to one end of said drive shaft for rotation therewith, a kaleidoscope carried by said cylinder, a source of light fixed in said housing for directing light rays through said kaleidoscope, a second support mounted in said housing, a guide carried by said second support, means carried by the remaining end of said drive shaft for cooling said source of light, a sleeve adjustably carried by said guide and registering with said projecting opening, and means for directing light rays from said kaleidoscope through said sleeve.

2. The combination of claim 1 wherein said means operatively connecting said cylinder to one end of said drive shaft includes reduction gearing.

3. The combination of claim 2 wherein said cooling means includes a fan blade carried by said drive shaft, and a conduit between said fan blade and said source of light.

4. The combination of claim 1 wherein said sleeve includes a forward lens and a rear lens removably secured to said sleeve.

5. The combination of claim 1 wherein said last mentioned means includes a further guide carried by said first support, a further cylinder carried by said further guide, and an elongated triangular conduit carried by said further guide.

6. The combination of claim 5 wherein said conduit includes a plurality of elongated sections having mirrored inner faces and non-reflecting outer faces.

7. The combination of claim 1 and a further sleeve opposing said source of light, a pair of lenses mounted in said further sleeve and registering with said directing means.

8. The combination of claim 7 wherein said pair of lenses include opposing convexed surfaces.

HUEY G. WESLEY.

REFERENCES CITED

The following references are of record in the file of this patent:

UNITED STATES PATENTS

| Number | Name | Date |
| --- | --- | --- |
| 1,449,122 | Marchand | Mar. 20, 1923 |
| 1,712,431 | Hadley | May 7, 1929 |
| 1,914,562 | Freeland | June 20, 1933 |
| 1,966,531 | Tint | July 17, 1934 |
| 2,038,909 | Smith et al. | Apr. 28, 1936 |
| 2,401,506 | Pechkranz | June 4, 1946 |

FOREIGN PATENTS

| Number | Country | Date |
| --- | --- | --- |
| 399,521 | Great Britain | Sept. 29, 1933 |